(12) United States Patent
Naruse

(10) Patent No.: US 8,775,637 B2
(45) Date of Patent: Jul. 8, 2014

(54) RECORDING MEDIUM STORING COMMUNICATION PROGRAM, INFORMATION PROCESSING APPARATUS, AND COMMUNICATION PROCEDURE

(75) Inventor: Akira Naruse, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 169 days.

(21) Appl. No.: 13/181,837

(22) Filed: Jul. 13, 2011

(65) Prior Publication Data

US 2012/0016997 A1 Jan. 19, 2012

(30) Foreign Application Priority Data

Jul. 15, 2010 (JP) ................................. 2010-161044

(51) Int. Cl.
*G06F 15/16* (2006.01)
(52) U.S. Cl.
USPC .......................................... 709/227; 709/228
(58) Field of Classification Search
USPC ................................................. 709/227, 228
See application file for complete search history.

(56) References Cited

U.S. PATENT DOCUMENTS

| | | | | |
|---|---|---|---|---|
| 2005/0021632 | A1* | 1/2005 | Rachlin ......................... | 709/206 |
| 2009/0016332 | A1* | 1/2009 | Aoki et al. .................... | 370/388 |
| 2009/0240915 | A1* | 9/2009 | Faraj .............................. | 712/28 |
| 2011/0179100 | A1* | 7/2011 | Kawai ........................... | 709/201 |
| 2011/0289221 | A1* | 11/2011 | Lowekamp ................... | 709/227 |
| 2012/0188874 | A1* | 7/2012 | Kumagai et al. ............. | 370/235 |

FOREIGN PATENT DOCUMENTS

| | | |
|---|---|---|
| JP | 11-066024 A | 3/1999 |
| JP | 2006-146391 | 6/2006 |
| JP | 2009-20797 A | 1/2009 |

* cited by examiner

*Primary Examiner* — Jerry Dennison
*Assistant Examiner* — Steven Nguyen
(74) *Attorney, Agent, or Firm* — Fujitsu Patent Center

(57) ABSTRACT

A computer acquires correspondence data including a plurality of combinations of identifiers of selected computers, in which parallel processes are started, and identifiers of the parallel processes, wherein the selected computers are among a plurality of computers connected to a multipath network having relay devices extending over two or more hierarchies. The computer specifies a network identifier to be used for distributing communication paths among the selected computers for every selected computer that includes an identifier in the correspondence data, wherein the specified network identifiers is among network identifiers of respective communication paths in the multipath network, and the specified network identifier corresponds to each identifier of a plurality of computers, and is used for routing.

6 Claims, 31 Drawing Sheets

FIG. 2A

RELATED ART

FIG. 9

```
# LID file
# upper sw: 4
comp00  1 2 3 4
comp01  5 6 7 8
comp02  9 10 11 12
comp03  13 14 15 16
comp04  17 18 19 20
comp05  21 22 23 24
comp06  25 26 27 28
comp07  29 30 31 32
comp08  33 34 35 36
comp09  37 38 39 40
comp10  41 42 43 44
comp11  45 46 47 48
comp12  49 50 51 52
comp13  53 54 55 56
comp14  57 58 59 60
comp15  61 62 63 64
```

FIG. 12

```
Hostfile comp 00
comp 05
comp 10
comp 12
```

FIG. 14 proc 0 : comp 00
proc 1 : comp 05
proc 2 : comp 10
proc 3 : comp 12

RECORDING MEDIUM STORING COMMUNICATION PROGRAM, INFORMATION PROCESSING APPARATUS, AND COMMUNICATION PROCEDURE

CROSS-REFERENCE TO RELATED APPLICATIONS

This application is based upon and claims the benefit of priority of the prior Japanese Patent Application No. 2010-161044, filed on Jul. 15, 2010, the entire contents of which are incorporated herein by reference.

FIELD

The present application relates to a multi-path network in which relay devices extend over two or more hierarchies.

BACKGROUND

In recent years, a cluster system constructed of a plurality of computers connected together in a high speed network has been widely known as a High Performance Computing (HPC) system. When executing a parallel processing program with this cluster system, parallel processes for the parallel processing program are distributed to a plurality of computers and then started. Thus, when performing data exchange between the parallel processes, communication may be performed between the computers. Therefore, the performance of inter-computer communication may affect the cluster system.

In order to improve the performance of inter-computer communication, for example, influences of a high-performance network, such as InfiniBand or Myrinet, and a communication library which makes full use of the high-performance network are considered. In many cases, a parallel processing program described by a communication Application Program Interface (API) called a Message Passing Interface (MPI) is executed on the cluster system. Therefore, various communication libraries based on the MPI specification have been provided.

For example, as illustrated in FIG. 1, if processes "0" to "N−1" are distributed to "N" computers and started, inter-process communication for data exchange is performed in many cases during computer processing defined by a parallel processing program. Although FIG. 1 illustrates an example in which communication is performed among all started processes, one-to-one communication between specific processes may be also performed. In the inter-process communication, an applicable module of the MPI library is called out to perform communication.

The patterns of the inter-process communication in the parallel processing programs are various while being limited by the program itself. Among the patterns, as illustrated in FIG. 1, a communication pattern "All-to-All" where data exchange is performed among all the started parallel processes is referred to as a communication pattern of interest. Then, the MPI specification also desires to implement All-to-All communication using the function MPI_AlltoAll( ). Although various algorithms are present for implementing all-to-all communication, a Ring algorithm has been used in many cases where data sizes are comparatively large and performance is rate-limited at the bandwidth of the network.

The ring algorithm will be described with reference to FIG. 2A to FIG. 2H. As illustrated in FIG. 2A, a case with eight processes, processes "0" to "7", will be considered. In this case, as illustrated in FIG. 2B, each process receives data from the process with the preceding process number and then sends the data to the process with the next process number. Here, the process subsequent to process with the process number "7" is of the process number "0" and the process prior to process with the process number "0" is of the process number "7".

Then, as illustrated in FIG. 2C, each process receives data from the process with a process number two places back and then sends the data to the process with the process number two places ahead. Then, as illustrated in FIG. 2D, each process receives data from the process with a process number three places ahead and then sends the data to the process with the process number three places behind. Furthermore, as illustrated in FIG. 2E, each process receives data from the process with the process number four places ahead and then sends the data to the process with the process number four places behind. Furthermore, as illustrated in FIG. 2F, each process receives data from the process with the process number five places ahead and then sends the data to the process with the process number five places behind. Furthermore, as illustrated in FIG. 2G, each process receives data from the process with the process number six places ahead and then sends the data to the process with the process number six places behind. Furthermore, as illustrated in FIG. 2H, each process receives data from the process with the process number seven places ahead and then sends the data to the process with the process number seven places behind.

In the case of employing the ring algorithm, the all-to-all communication may be efficiently performed as long as the configuration of the network does not correspond to the problematic configuration described below.

Next, the network configuration will be examined. As illustrated in FIG. 3, if the number of computers to be used is small, these computers may be connected together with a single network switch SW (hereinafter, simply referred to as a switch). In other words, eight computers are connected to one switch, and one process is started in each computer. This case is equivalent to a crossbar connection, so that no competition exists among network links even if all-to-all communication is performed among processes being started.

On the other hand, if the number of computers to be used exceeds the number that allows computers to be connected with one switch, the switch may be a multistage switch. The network with a simplified multistage switch configuration may be a tree network as illustrated in FIG. 4. In FIG. 4, the number of computers and the number of processes to be started are the same as those of the example illustrated in FIG. 3 but the number of switch SW ports is less than eight. In addition, FIG. 4 illustrates a communication state in which processes 0 to 3 perform data transmission in FIG. 2E. The switch is made in two stages and the number of the upper switches is limited to "1". Thus, the link zone between the upper switch and the lower switch is insufficient. Therefore, if all-to-all communication is performed among eight processes, a competition of links may occur between the upper switch and the lower switch as represented by an encircled portion in FIG. 4, decreasing throughput.

Therefore, in the case of putting a high priority on the network performance, a fat tree network has been employed in many cases. An example illustrated in FIG. 5 includes four upper switches, so that the number of links from the lower switches to the upper switches (also referred to as up-links) may be equal to the number of links from the lower switches to the computers (also referred to as down-links). The data transmission to the computers where the processes "0" and "4" are started is set up to pass through the upper switch "A". In addition, the data transmission to the computers where the processes "1" and "5" are started is set up to pass through the upper switch "B". Furthermore, the data transmission to the computers where the processes "2" and "6" are started is set up to pass through the upper switch "C". Furthermore, the data transmission to the computers where the processes "3" and "7" are started is set up to pass through the upper switch "D". Thus, as illustrated in FIG. 5, communication is performed without any link competition when the computers in which the processes "0" to "3" are started transmit data in FIG. 2E.

However, in the case of a network where a packet transfer path, such as the InfiniBand as mentioned above, may not be dynamically changed (i.e., a static-routing network), communication may be concentrated on a specific link between the upper switches and the lower switches. This case is exemplified in FIG. 6. The example illustrated in FIG. 6 includes 16 computers which are connected to a fat tree network having four upper switches and four lower switches. In this system, one computer is selected depending on the execution statuses or the like of the respective computers, and the selected computer starts processing. However, packets transmitted from the selected computer may unevenly pass through the upper switches.

In the example illustrated in FIG. 6, the data transmission to the computers where the processes "0", "4", "6", and "7" are respectively started is set up to pass through the upper switch "A". The data transmission to the computers where the processes "1", and "5" are respectively started is set up to pass through the upper switch "B". The data transmission to the computer where the process "2" is started is set up to pass through the upper switch "C". The data transmission to the computer where the process "3" is started is set up to pass through the upper switch "D". Thus, in the communication state of the case of transmitting data to the respective computers where the processes "0" to "3" are started in FIG. 2E, an up-link to the upper switch "A" is used in data communication, except the data communication from the computer with the started process "1" to the computer with the started process "5". As a result, a link competition occurs as represented by the circled portion in the figure.

In this way, the communication load may be concentrated on a certain link even though the fat tree network is applied. Thus, communication performance may be decreased. This case may occur when the static-routing network, such as the InfiniBand, is employed. In other words, as illustrated in FIG. 7, each computer is assigned only one network identifier (referred to as "LID" in the InifiniBand) used for routing in the network. However, it may become a disadvantage for each switch when the network identifier is fixedly brought into correspondence with a packet destination port. Specifically, the LID of the leftmost computer is "1", so that a packet addressed to this computer fixedly passes through the upper switch "A". Similarly, the LID of the rightmost computer is "16", so that a packet addressed to this computer fixedly passes through the upper switch "D".

Furthermore, as described above, the selection of computers that start parallel processes is performed without consideration of the relationship between the packet destination port and the LID assigned to the computer. Thus, communication paths for data transmission (specifically, the upper switches as routes for data transmission) may be unequally used.

SUMMARY

In the above description, the exemplary all-to-all communication has been described as an example in which link competition tends to be caused. However, if the computers are selected and their respective processes are started in the manner illustrated in FIG. 6, data communication through the upper switch "A" may tend to occur even in another case (for example, in the case where one-to-one communication is simultaneously performed in a combination of a plurality of processes). As a result, the possibility of causing link competition may be increased.

Although technologies for dynamically changing communication paths have been found in the art, no conventional technology which focuses on the aforementioned disadvantage of the static-routing network has been found in the art.

According to an aspect of the invention, a computer acquires correspondence data including a plurality of combinations of identifiers of selected computers, in which parallel processes are started, and identifiers of the parallel processes, wherein the selected computers are among a plurality of computers connected to a multipath network having relay devices extending over two or more hierarchies. The computer specifies a network identifier to be used for distributing communication paths among the selected computers for every selected computer that includes an identifier in the correspondence data, wherein the specified network identifiers is among network identifiers of respective communication paths in the multipath network, and the specified network identifier corresponds to each identifier of a plurality of computers, and is used for routing.

The object and advantages of the invention will be realized and attained by at least the features, elements, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 2A is a diagram illustrating a ring algorithm;

FIG. 9 is a diagram illustrating an exemplary LID file;

Figure 12:
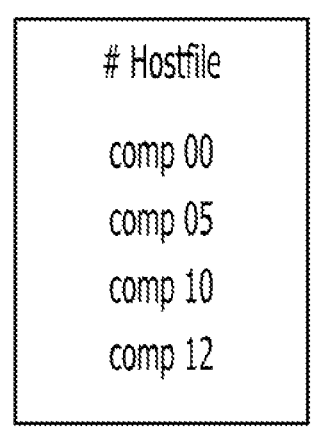

FIG. 12 is a diagram illustrating an exemplary host file;

FIG. 14 is a diagram illustrating an exemplary correspondence table;

DESCRIPTION OF EMBODIMENTS

Figure 8:
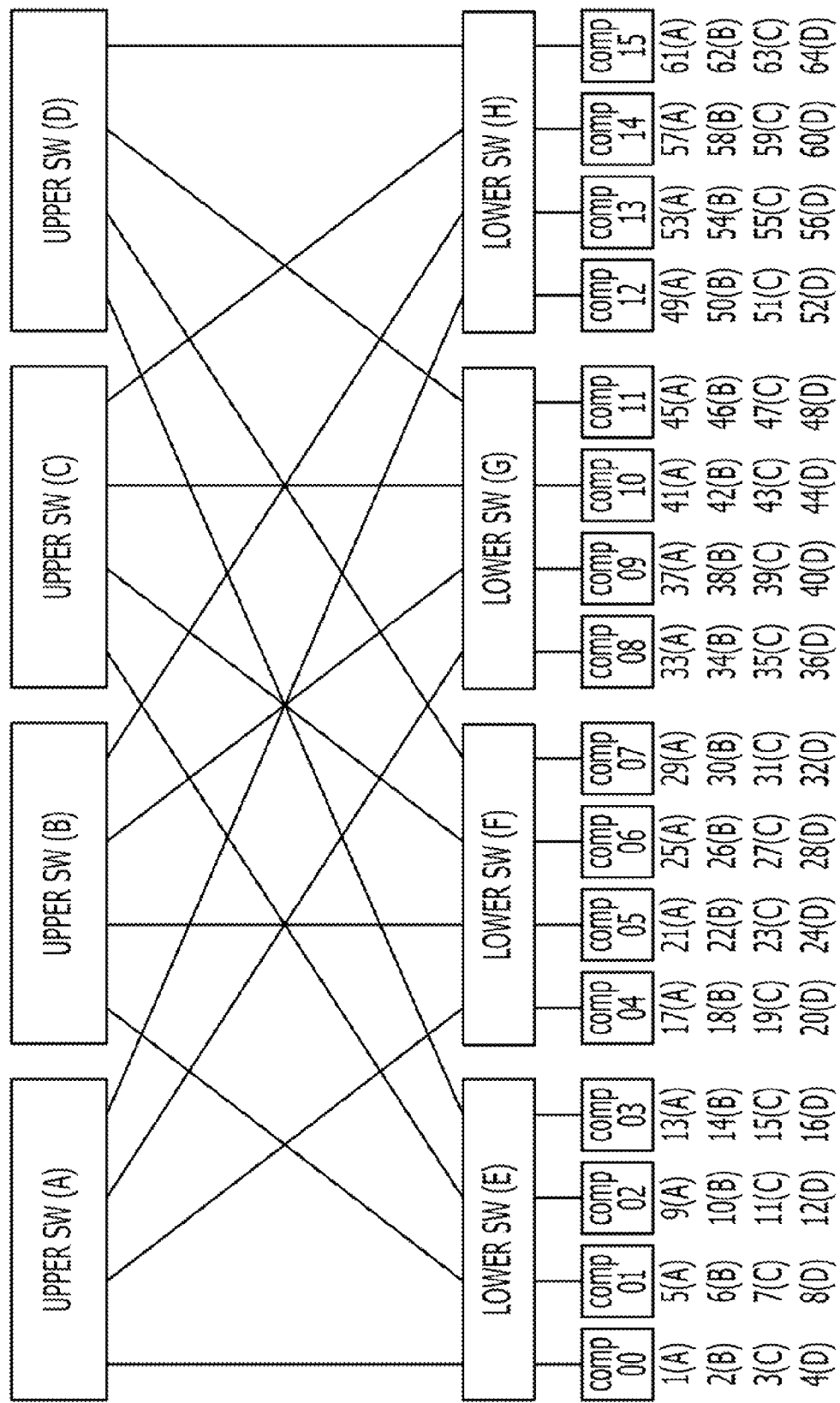
FIG. 8 is an exemplary multipath multistage network according to an embodiment.

FIG. 8 illustrates a multipath multistage network (namely, a multipath network in which relay devices extend over two or more hierarchies) according to an embodiment of the present technology. In the example illustrated in FIG. 8, 16 computers, "comp 00" to "comp 15", are connected together through four upper switches and four lower switches. The lower switches E to H are connected to the upper switches A to D, respectively. In other words, a communication path from one lower switch to another lower switch is quadruplicated. Specifically, there are a communication path passing through the upper switch A, a communication path passing through the upper switch B, a communication path passing through the upper switch C, and a communication path passing through the upper switch D. In the present embodiment, each computer is assigned four network identifiers corresponding to these four communication paths (hereinafter, the identifiers will be referred to as LIDs for illustrating the InfiniBand).

Specifically, FIG. 8 illustrates LIDs and communication paths (here, the identifiers of the upper switches) assigned to the computers "comp 00" to "comp 15". For example, the computer "comp 00" is assigned LID "1" for the communication path passing through the upper switch A, LID "2" for the communication path passing through the upper switch B, LID "3" for the communication path passing through the upper switch C, and LID "4" for the communication path passing through the upper switch D. In addition, the computer "comp 15" is assigned LID "61" for the communication path passing through the upper switch A, LID "62" for the communication path passing through the upper switch B, LID "63" for the communication path passing through the upper switch C, and LID "64" for the communication path passing through the upper switch D.

Each computer performs communication between parallel processes using any one of the LIDs as described below.

The upper and lower switches are designed to specify output port numbers corresponding to their LIDs, respectively. The LID of a destination computer is set to the header of a packet to be transmitted in the multipath multistage network. Thus, each switch may specify the output port to which a received packet is to be transferred with reference to the LID.

For example, when the lower switch E receives a packet where the LID of the destination computer is "17", the packet is transferred to the upper switch A. Similarly, when the lower switch E receives a packet where the LID of the destination computer is "18", the packet is transferred to the upper switch B. For example, when the lower switch E receives a packet where the LID of the destination computer is "19", the packet is transferred to the upper switch C. Furthermore, when the lower switch E receives a packet where the LID of the destination computer is "20", the packet is transferred to the upper switch D. All of these packets are addressed to the computer "comp 04", but the upper switches they pass through are different as described above.

In the present embodiment, LID files that represent these configurations are stored in the respective computers or in a common storage as described later. FIG. 9 is a diagram illustrating an exemplary LID file corresponding to the configuration illustrated in FIG. 8. In the example illustrated in FIG. 9, the LID file includes data, which indicates that this file is a "LID file" on the first line, and the number of upper switches Nu is "4" (i.e., the number of communication paths) on the second line. The number of the upper switches (Nu) will be used in a process to be described later. The third and subsequent lines indicate the correspondence between the identifiers of the respective computers and the four assigned LIDs. In the present embodiment, the LID file describes, in order from left to right, the LID for the communication path passing through the upper switch A, the LID for the communication path passing through the upper switch B, the LID for the communication path passing through the upper switch C, and the LID for the communication path passing through the upper switch D. The arrangement of the LIDs is not limited to the one described above, but the computers employ the same arrangement.

Figure 10:
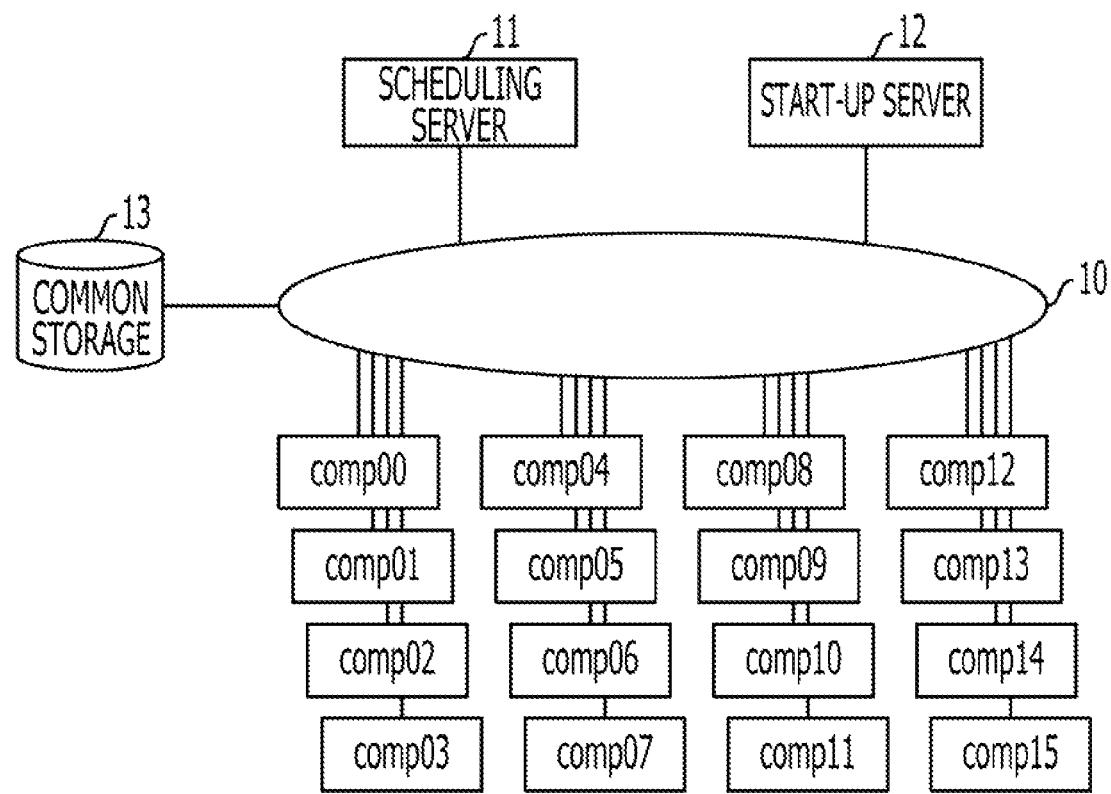
FIG. 10 is a diagram illustrating an exemplary system according to the embodiment.
Figure 11:
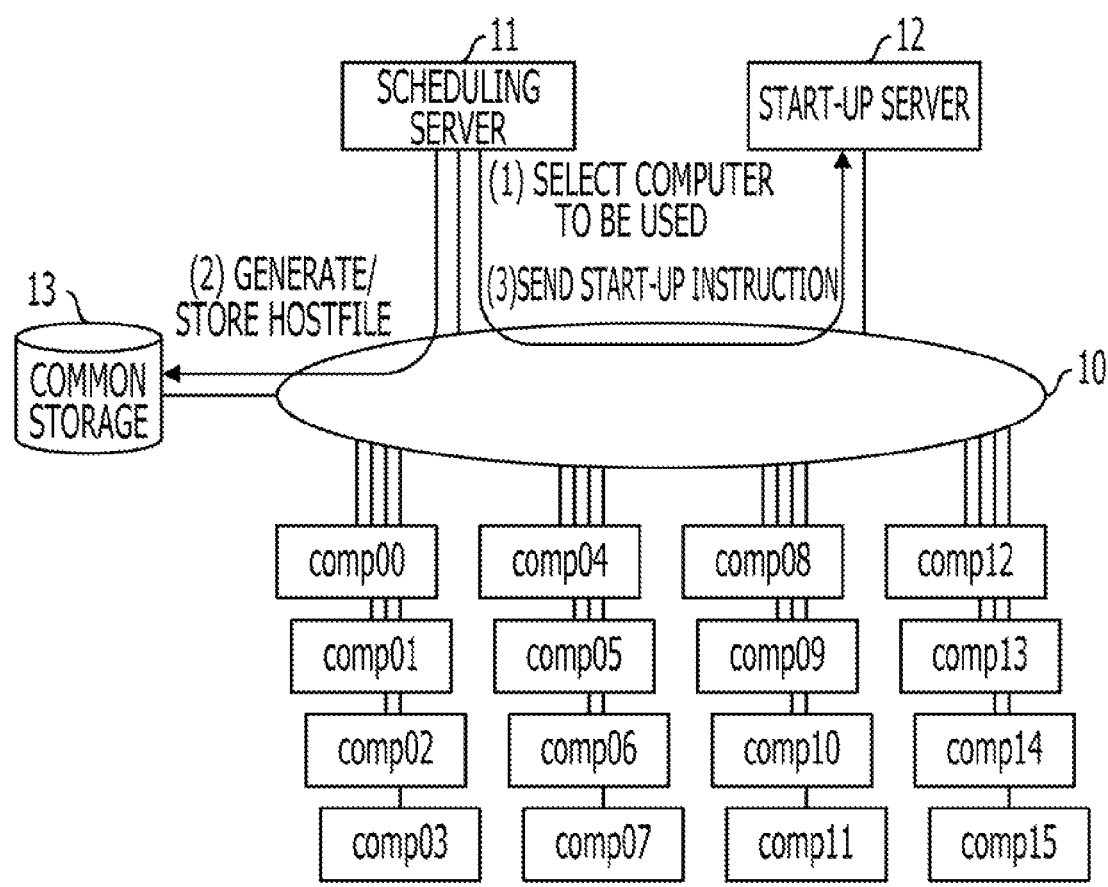
FIG. 11 is a diagram illustrating the operation of the system.

Next, an exemplary configuration of a system including the multipath multistage network illustrated in FIG. 8 will be described with reference to FIG. 10. In FIG. 10, the upper switches A to D and the lower switches E to H, which are illustrated in FIG. 8, are not illustrated but included in a network 10 connected to the computers "comp 00" to "comp 15". The network 10 is connected to a scheduling server 11, a start-up server 12, and a common storage 13. Here, the common storage 13 may be used by computers "comp 00" to "comp 15" connected to the network 10.

The scheduling server 11 obtains an execution status of each of the computers "comp 00" to "comp 15", determines a parallel process to be started and a computer on which the parallel process is to be started, and instructs the start-up server 12 to start the parallel process. The start-up server 12 starts the parallel process on the specified computer in response to an instruction from the scheduling server 11.

In FIG. 10, the start-up server 12 is represented as another computer which is different from the scheduling server 11. Alternatively, the start-up server 12 may be a server which is physically substantially the same as the scheduling server 11. Furthermore, the first computer described in a host file, which will be described later, may be operated as a start-up server.

The case where the system as illustrated in FIG. 10 causes four computers to start four parallel processes will be described below. In the present embodiment, each of the parallel processes may be started on another computer.

The operation of the exemplary system illustrated in FIG. 10 will be described with reference to FIGS. 11 to 20. First, the scheduling server 11 selects computers to be used with reference to the execution status of computers "comp 00" to "comp 15" (step (1)). For example, the computers "comp 00", "comp 05", "comp 10", and "comp 12" are selected. Then, the scheduling server 11 generates a host file on which the identifiers of the selected computers (for example, computer names) are listed and then stores the host file (Hostfile) in the common storage 13 (step (2)). The host file (Hostfile) may be, for example, the one illustrated in FIG. 12. As illustrated in FIG. 12, the host file (Hostfile) includes the identifiers of four computers selected in step (1).

The scheduling server 11 directs the start-up server 12 to start parallel processes on the computers listed in the host file (Hostfile) (step (3)). The scheduling server 11 may specify where the host file (Hostfile) is stored on the common storage 13 or may actually transmit the host file (Hostfile) to the start-up server 12.

Figure 13:
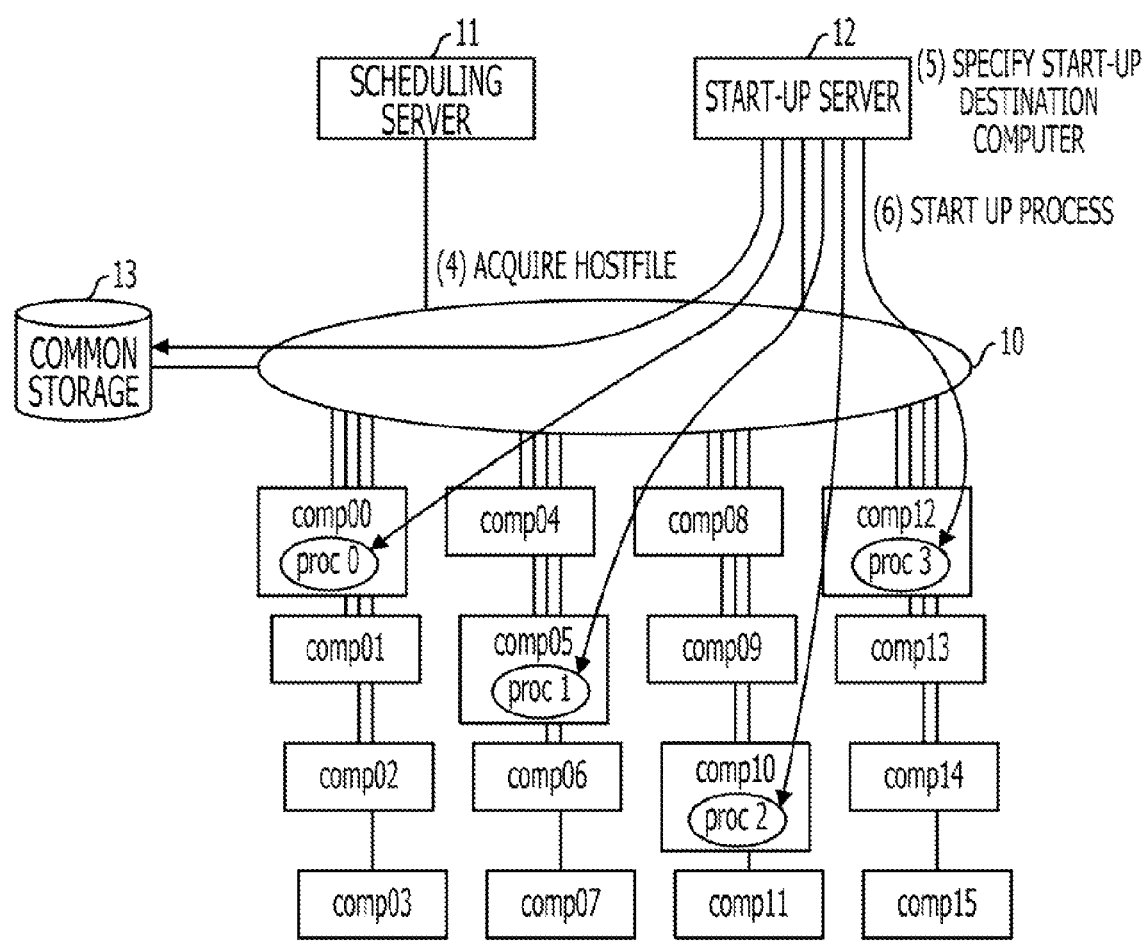
FIG. 13 is a diagram illustrating the operation of the system.

Subsequently, the process proceeds to the procedure illustrated in FIG. 13, where the start-up server 12 acquires a host file (Hostfile) stored in, for example, the common storage 13 (step (4)) and specifies the computers "comp 00", "comp 05", "comp 10", and "comp 12" of the start-up destinations which are defined in the host file (Hostfile) (step (5)). Then, the start-up sever 12 starts parallel processes on the start-up destination computers "comp 00", "comp 05", "comp 10", and "comp 12" (step (6)). At this time, the start-up server 12 generates a correspondence table that brings the identifiers of processes started for the same job into correspondence with the identifiers of the start-up destination computers where the processes are started. Then, the start-up server 12 stores the correspondence table into the common storage 13 and notifies the start-up destination computers about the storage location. Alternatively, the start-up server 12 transmits the correspondence table to the start-up destination computers. The start-up server 12 notifies the start-up destination computers about the identifiers of processes to be started on the respective computers.

FIG. 14 illustrates an exemplary correspondence table. In the example illustrated in FIG. 14, process identifiers, "proc 0", "proc 1", "proc 2", and "proc 3" (the suffix "proc" is provided for clarifying the meaning and the numerals 0 to 3 represent identifiers) are brought into correspondence with the respective start-up destination computers, "comp 00", "comp 05", "comp 10", and "comp 12". In the present embodiment, the process identifiers are sequential integers, such as 0 to 3.

Figure 15:
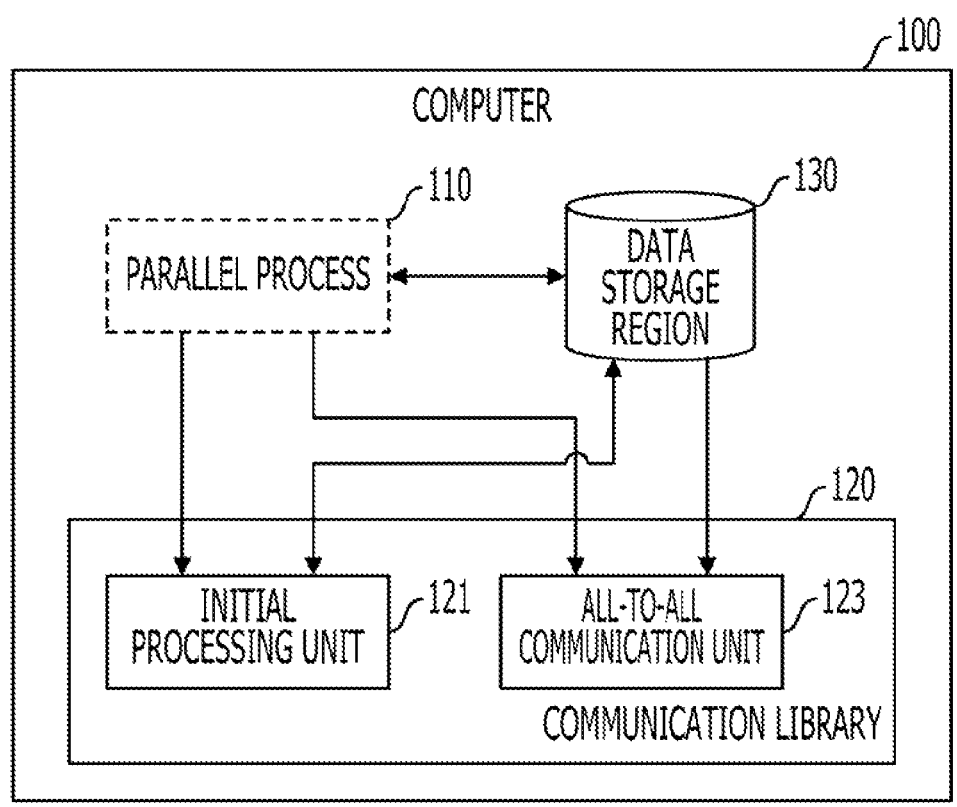
FIG. 15 is a diagram illustrating the configuration of a computer where a parallel process is started.

Next, the start-up destination computer will be described with reference to FIGS. 15 to 20. FIG. 15 is a diagram schematically illustrating the functional configuration of a start-up destination computer 100. The start-up server 12 allows the start-up destination computer 100 to dynamically start a parallel process 110. Data about the procedures of the parallel process 110 is stored in a data storage region 130. In addition, a communication library 120 is previously prepared in the start-up destination computer 100. The communication library 120 follows, for example, the MPI specification and includes an initial processing unit 121, which corresponds to an MPI_Init module, and an all-to-all communication unit 123, which corresponds to an MPI_All-to-All module. The parallel process 110 performs initial procedures by calling out the initial processing unit 121 to carry out inter-process communication. In the case of all-to-all communication, the all-to-all communication unit 123 is called out and caused to perform all-to-all communication among all the parallel processes which are started for the same job. The initial processing unit 121 and the all-to-all communication unit 123 of the communication library 120 may perform procedures using data stored in the data storage region 130 depending on the situation. It is noted that the communication library 120 also includes other modules. However, only the modules related to the present embodiment are illustrated herein.

As described above, the start-up server 12 notifies the start-up computers about a correspondence table that brings the identifiers of the processes started for the same job into correspondence with the identifiers of the start-up destination computers where the processes are started. The start-up server 12 also notifies the start-up computers about the identifiers of processes started in the respective start-up destination computers. The data may be, for example, stored in the data storage region 130. Furthermore, as described above, the correspondence table may be stored in the common storage 13. In this case, the data storage region 130 may store data about the storage location of the correspondence table.

The procedures will be specifically described with reference to FIGS. 16 and 17. First, the started parallel process 110 calls out the initial processing unit 121 of the communication library 120 (step S1 in FIG. 16). When the initial processing unit 121 is called out, the initial processing unit 121 performs a procedure as illustrated in FIG. 17.

Figure 17:
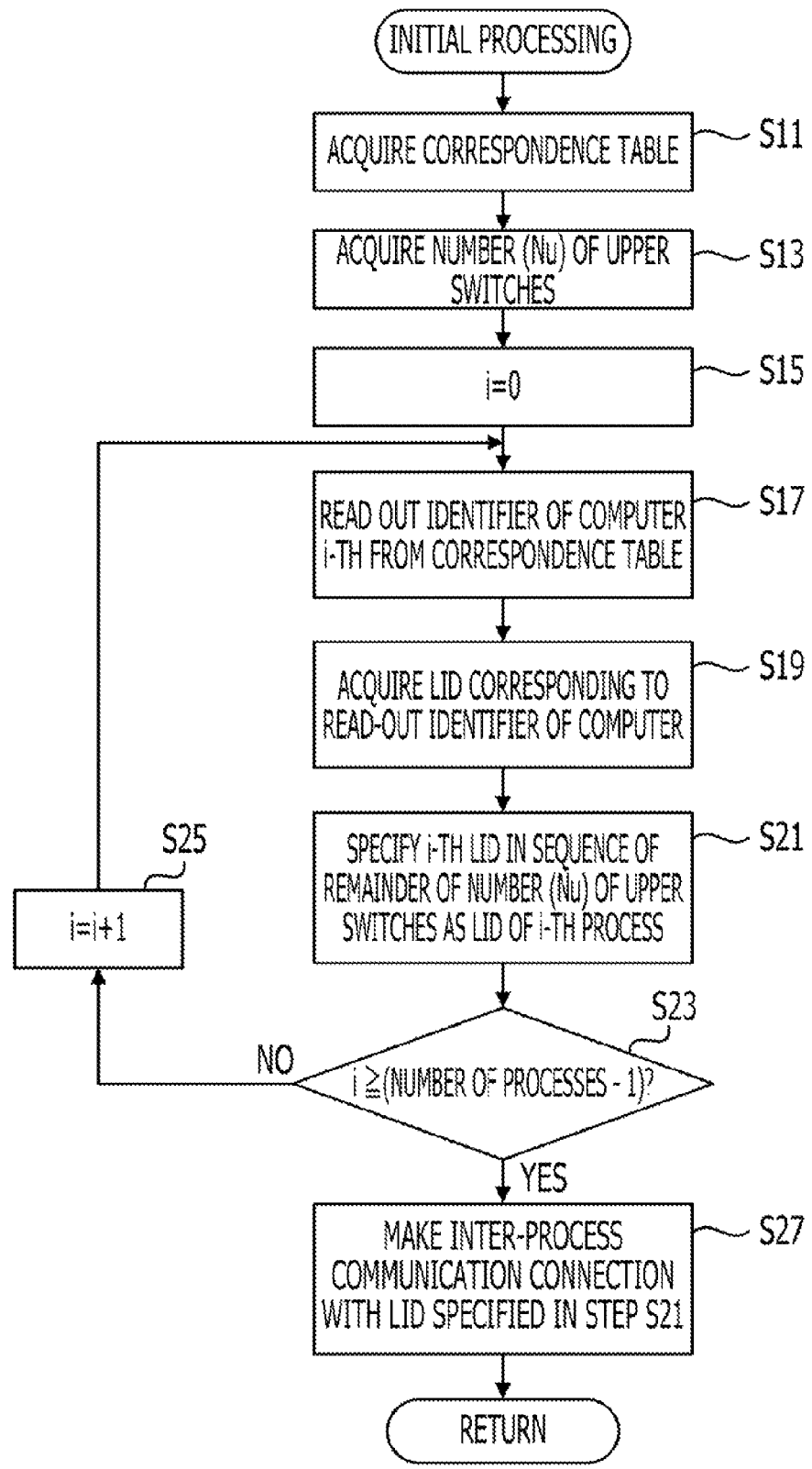
FIG. 17 is a diagram illustrating the operation of an initial processing unit.

The initial processing unit 121 acquires a correspondence table (step S11 in FIG. 17). The correspondence table is loaded from the data storage region 130 when the correspondence table is stored in the data storage region 130. On the other hand, when the correspondence table is stored in the common storage 13, the correspondence table is acquired from the common storage 13.

Furthermore, the initial processing unit 121 acquires the number of upper switches (Nu), which is defined in the LID file (FIG. 9) (step S13). The LID file may be held in each computer or may be stored in the common storage 13. Therefore, the initial processing unit 121 reads out the number of the upper switches (Nu) from the LID file retained in the data storage region 130 or in a certain storage device of its own computer. Alternatively, by accessing the LID file stored in the common storage 13 through the network 10, the number of the top switches (Nu) is read out from the LID file. In step S13, all the LID files may be loaded from the common storage 13.

Next, the initial processing unit 121 initializes a counter "i" of the identifier of the process (step S15). Furthermore, the initial processing unit 121 reads out the identifier of the "i"-th computer from the correspondence table obtained in step S11 (step S17). In the example illustrated in FIG. 14, "comp 00" is obtained if "i" is equal to 0 (i=0). In addition, the initial processing unit 121 acquires the LID corresponding to the read-out identifier of the computer from the LID file (step S19). In a manner similar to the step S13, the LID is acquired from the LID-file retaining location. As described above, each computer corresponds to four LIDs. Thus, four LIDs are read out. Since the same number of LIDs as the number of communication paths (i.e., upper switches) is registered in the LID file, all of LIDs are read out. For example, the LIDs corresponding to "comp 00" are "1", "2", "3", and "4".

Subsequently, the initial processing unit 121 specifies an "i"-th LID in the sequence of the remainder of the number (Nu) of the upper switches (=i mod Nu) as the LID of the "i"-th process (step S21). If Nu=4 at i=0, the remainder is "0". Thus, the initial processing unit 121 specifies a first LID="1".

Then, the initial processing unit 121 determines whether "i" is equal to or greater than "the number of processes−1", which is specified from the correspondence table (step S23). If "i" does not satisfy this condition, the initial processing unit 121 increments the value of "i" by one (step S25). Then, the procedure returns to the step S17.

If the identifier of the process becomes i=1, the identifier of the corresponding computer, "comp 05", is specified. Then, the LIDs "21", "22", "23", and "24", which correspond to the identifier of the computer, "comp 05" are obtained. The remainder of Nu=4 at i=1 is "1". Thus, the second LID "22" is specified. Subsequently, if it is processed in this way, the LID is specified as "43" for the identifier of the process "i=2".

Furthermore, the LID is specified as "52" for the identifier of the process "i=3". For example, data about the correspondence between the process identifiers and the LIDs (FIG. 18) may be stored in the data storage region 130 or the like. Alternatively, the data about the correspondence between the process identifiers and the LIDs may be generated. In any case, the correspondence table allows the specification of the correspondence relationships among the identifiers of the processes, the identifiers of the start-up destination computers, and the LIDs. Furthermore, the specified LIDs may be registered in the correspondence table.

It is noted that the above procedure is performed by the respective start-up destination computers in parallel.

Therefore, the initial processing unit 121 makes an inter-process communication connection with the LIDs which are specified in the step S21 (step S27). This procedure itself is similar to the conventional procedure, so that further description will be omitted.

By performing the procedure as described above, preparation for communicating with the parallel process of another start-up destination computer is completed.

Figure 16:
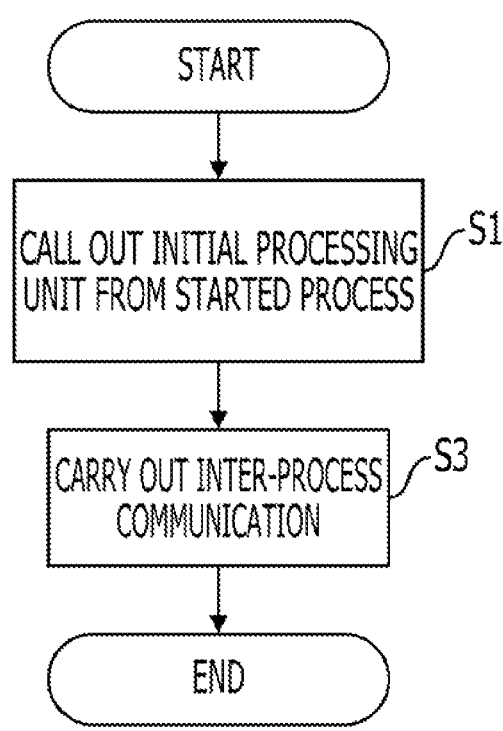
FIG. 16 is a diagram illustrating the operation of a computer where a parallel process is started.

Thus, referring back to the description of the procedure in FIG. 16, the parallel process 110 performs inter-process communication using the communication connection established in step S27 (step S3). The inter-process communication may be all-to-all communication with the all-to-all communication unit 123 or may be one-to-one communication. The step S3 is performed until the procedure of the parallel process 110 is completed.

As described above, the disproportional use of communication paths does not occur as long as the correspondence between the identifiers of the processes or the identifiers of the computers and the LIDs is used. Thus, no link collision occurs in links between the upper switches and the lower switches at the time of data communication. In other words, the LID "1" corresponds to a communication path passing through the upper switch A, the LID "22" corresponds to a communication path passing through the upper switch B, the LID "43" corresponds to a communication path passing through the upper switch C, and the LID "52" corresponds to a communication path passing through the upper switch D. Thus, since the communication paths do not overlap with one another, no link collision occurs even if all-to-all communication is performed using a ring algorithm.

In the example described above, the step S21 assigns LIDs to the respective processes (or computers) to make the upper switches in the communication paths cyclic. Alternatively, another method may be employed to assign the LIDs to the respective processes so that the upper switches may be distributed.

Figure 1:
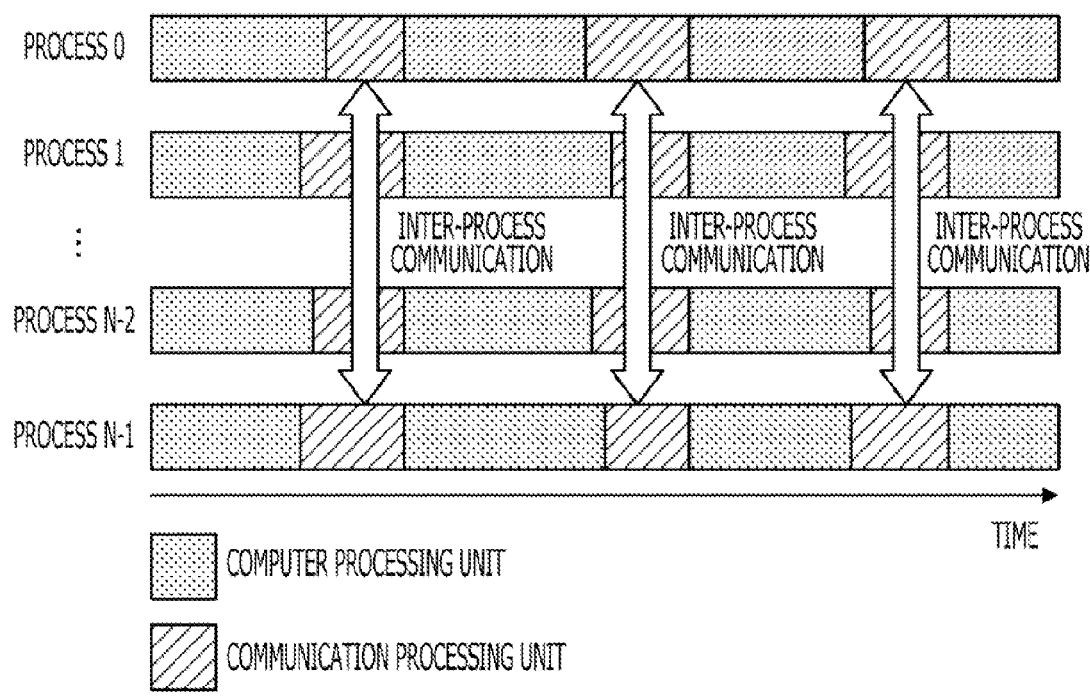
FIG. 1 is a diagram illustrating an inter-process communication.
Figure 2A:
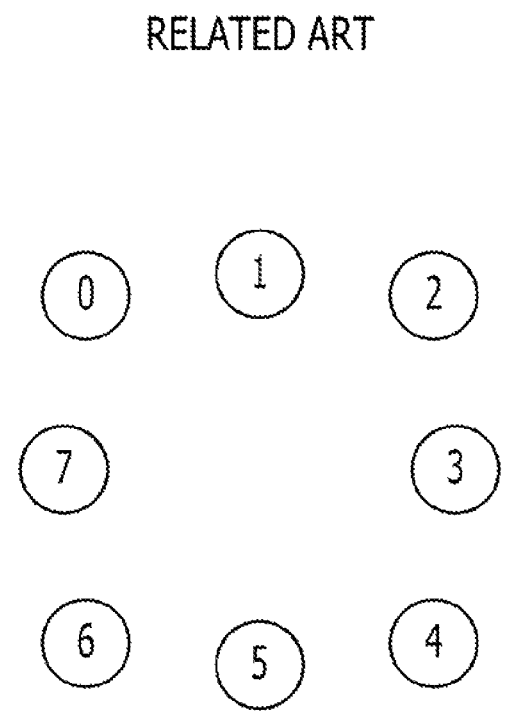
Figure 2B:
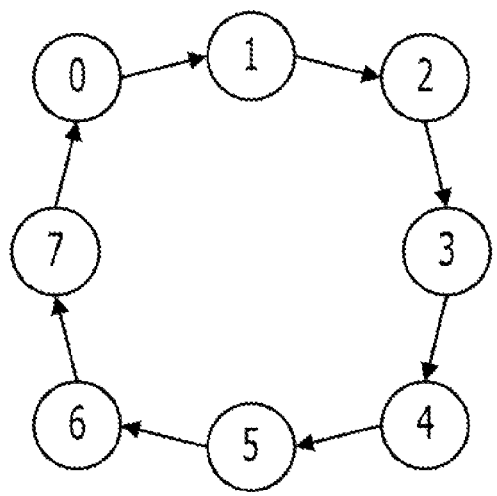
FIG. 2B is a diagram illustrating the ring algorithm.
Figure 2C:
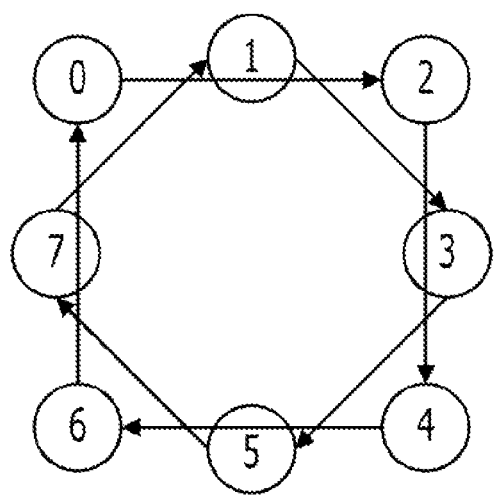
FIG. 2C is a diagram illustrating the ring algorithm.
Figure 2D:
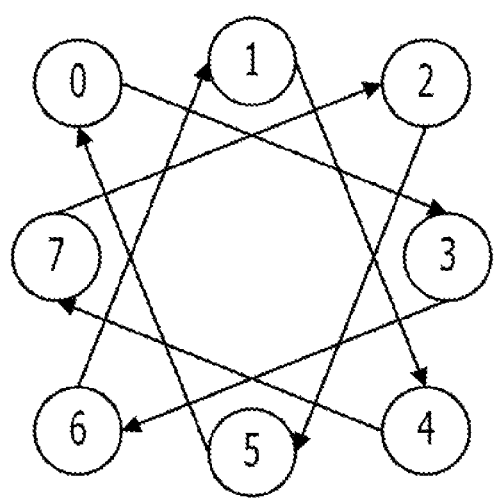
FIG. 2D is a diagram illustrating the ring algorithm.
Figure 2E:
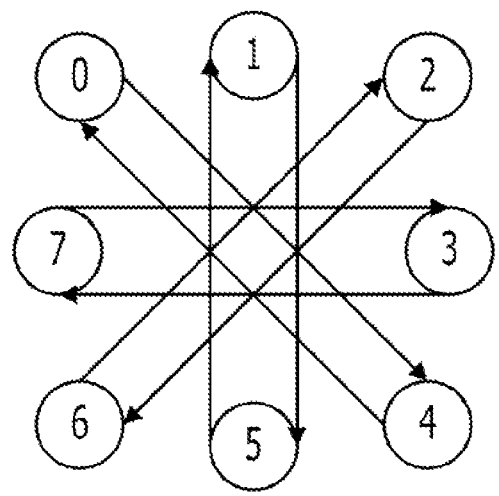
FIG. 2E is a diagram illustrating the ring algorithm.
Figure 2F:
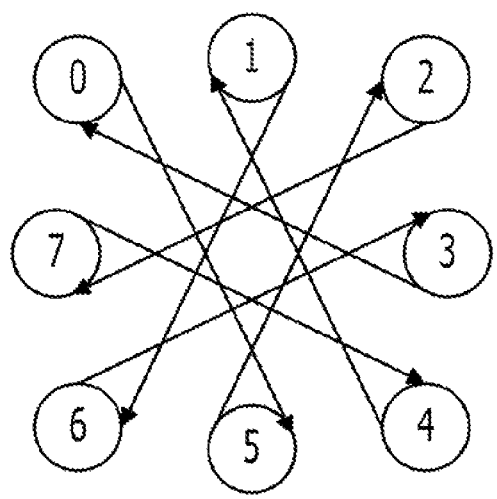
FIG. 2F is a diagram illustrating the ring algorithm.
Figure 2G:
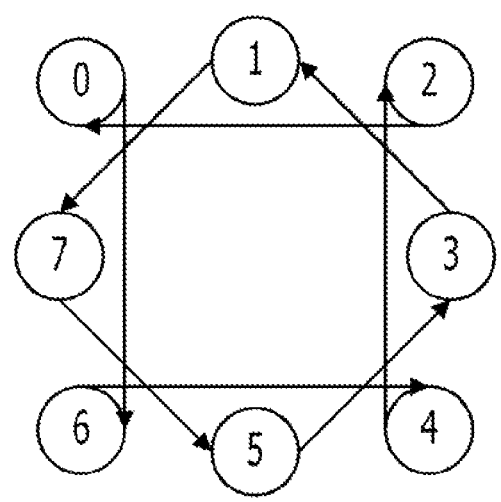
FIG. 2G is a diagram illustrating the ring algorithm.
Figure 2H:
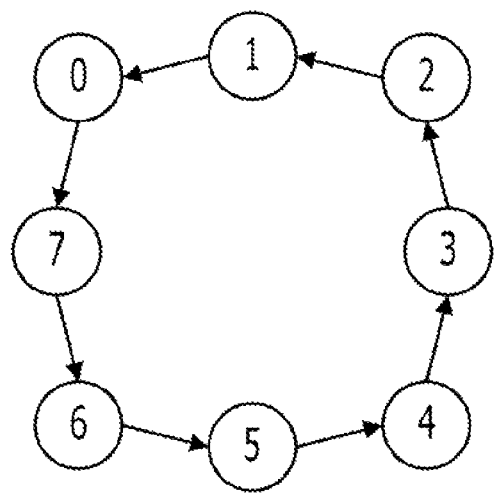
FIG. 2H is a diagram illustrating the ring algorithm.
Figure 3:
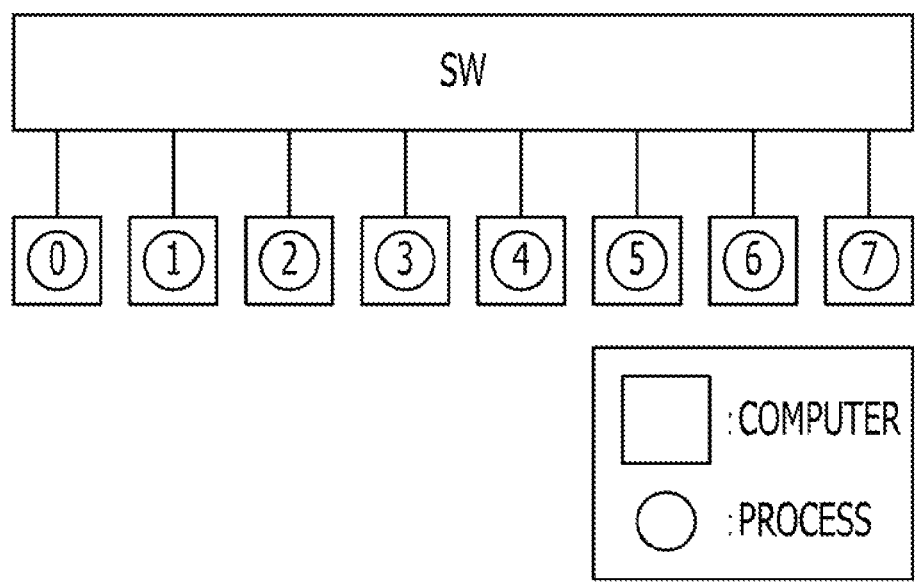
FIG. 3 is a diagram illustrating an exemplary network configuration.
Figure 4:
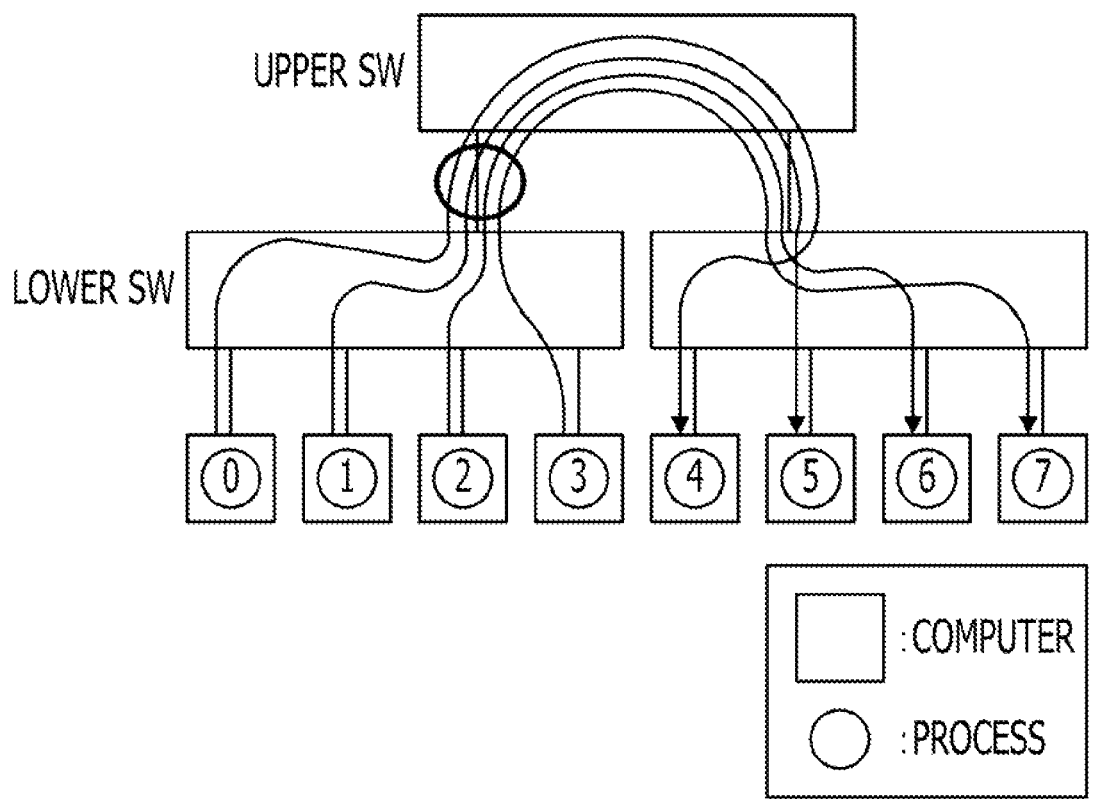
FIG. 4 is a diagram illustrating an exemplary network configuration.
Figure 5:
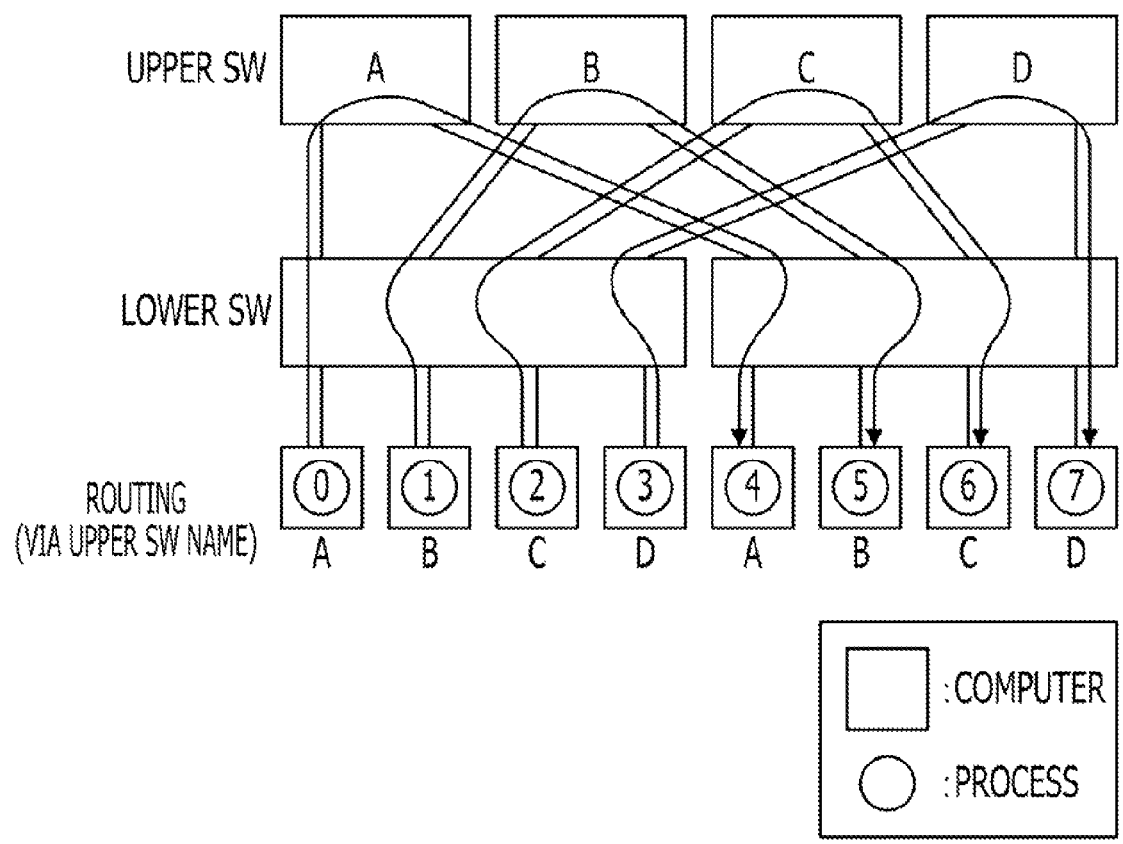
FIG. 5 is a diagram illustrating an all-to-all communication in a fat tree network.
Figure 6:
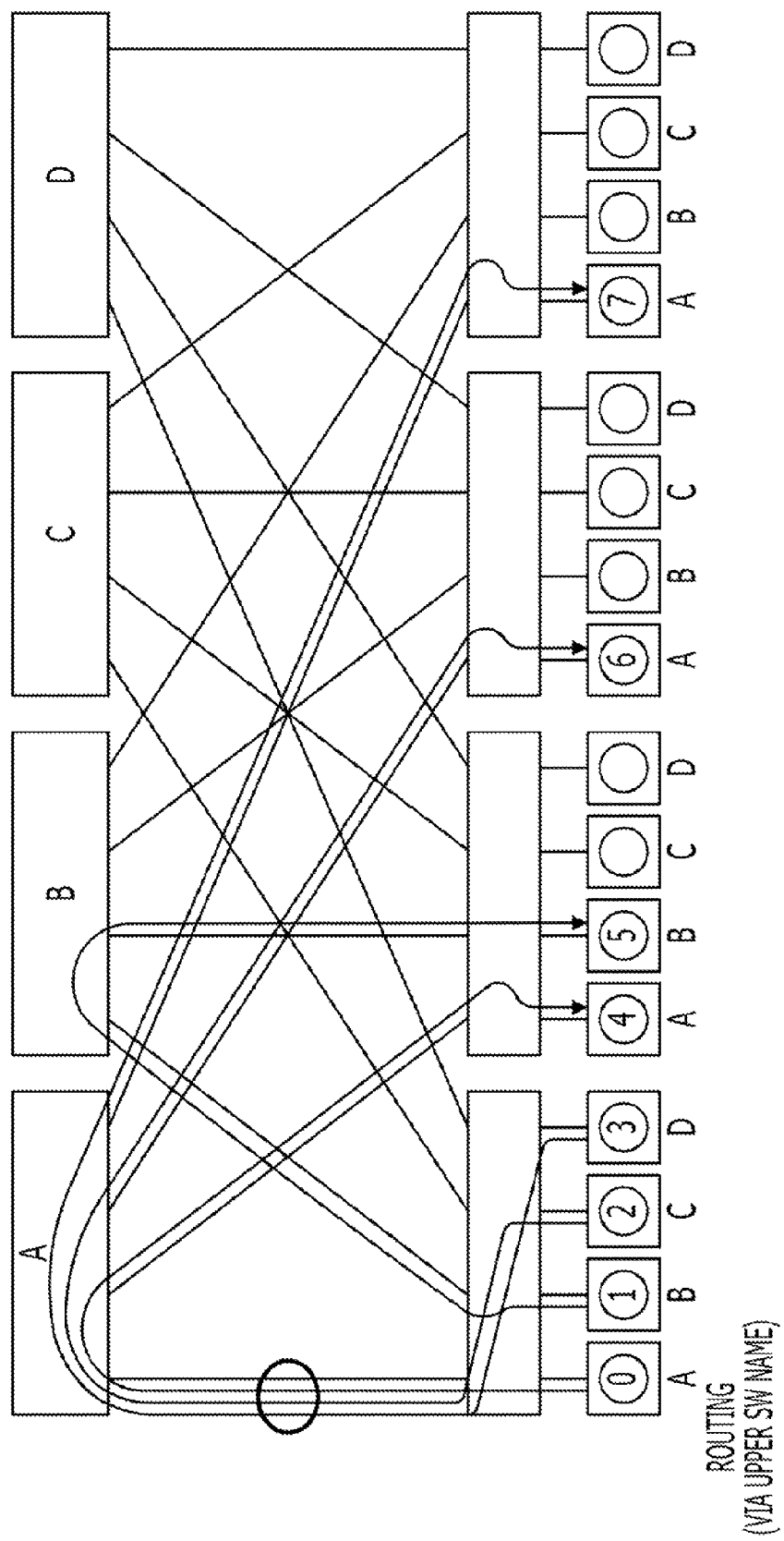
FIG. 6 is a diagram illustrating an exemplary case where link competition occurs in the fat tree network.
Figure 7:
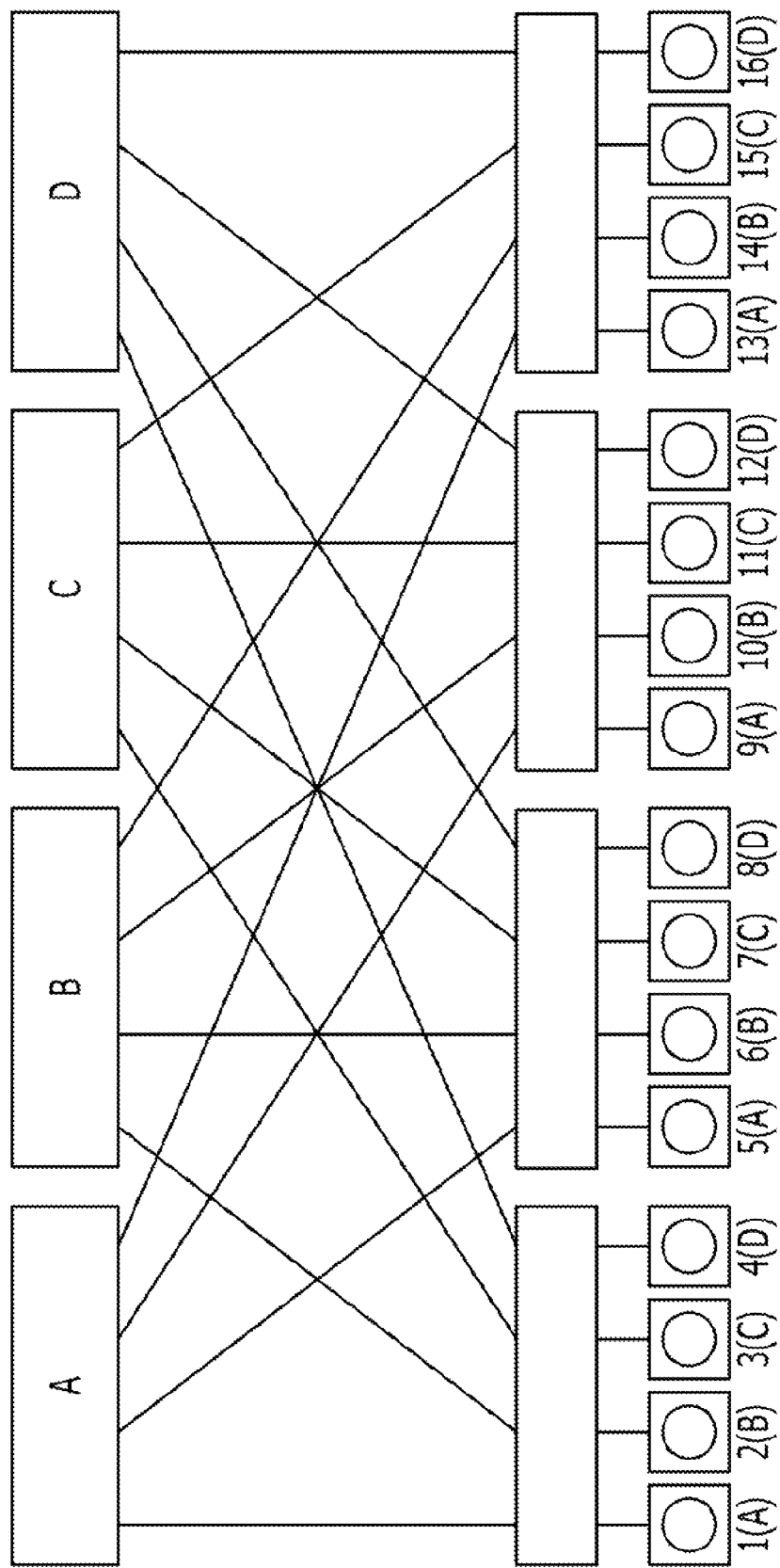
FIG. 7 is an exemplary multipath multistage network with InfiniBand.
Figure 19:
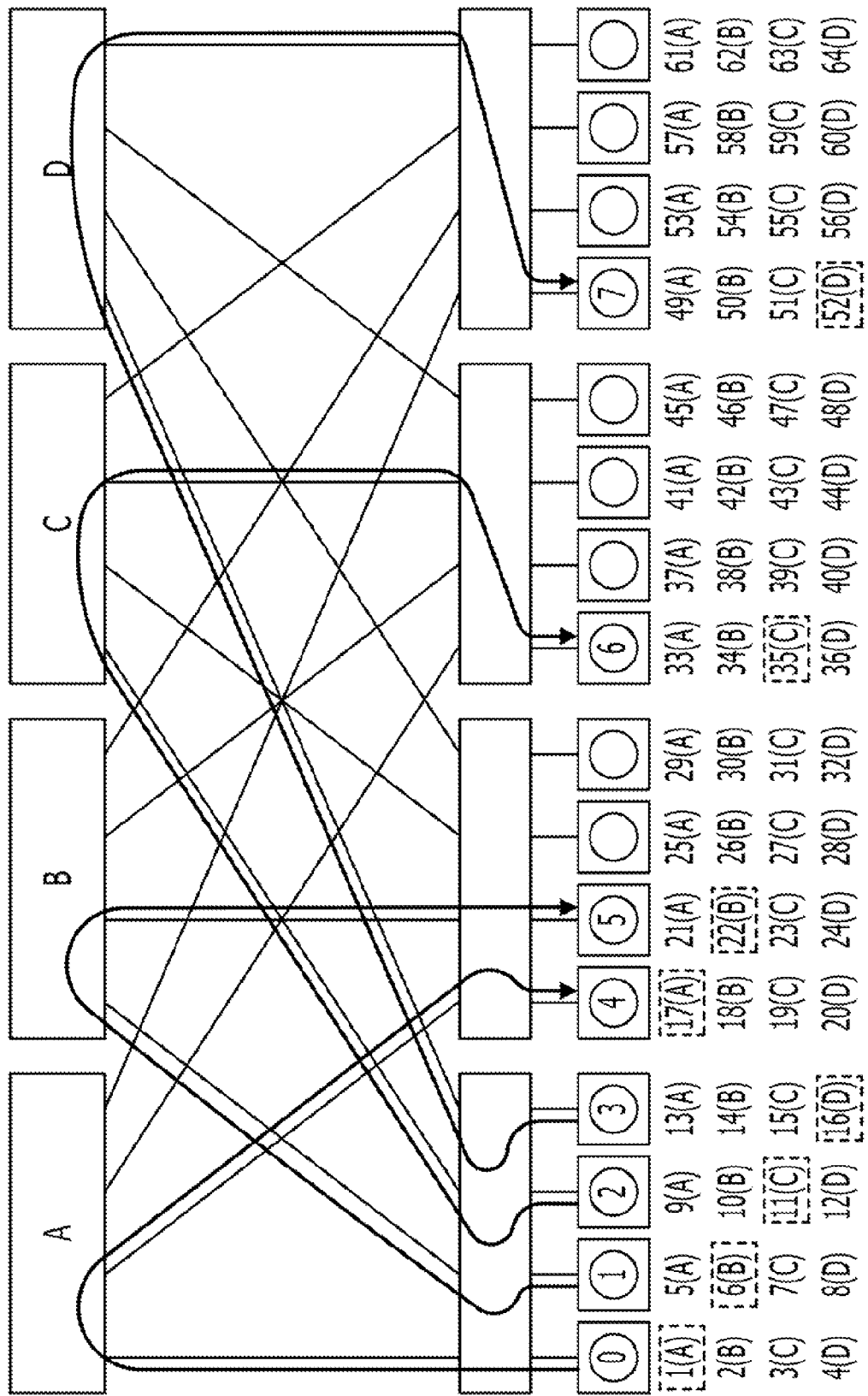
FIG. 19 is a diagram illustrating a case where link competition does not occur.

Furthermore, the number of the processes is as small as four in the aforementioned concrete example. Thus, significant advantageous effects may not be easily recognized. To facilitate the understanding, for example, a case where a multipath multistage network is employed will be described with reference to FIG. 6. Here, FIG. 19 illustrates a case where the multipath multistage network is similar to the network illustrated in FIG. 6 and employed to start eight processes in the same computer as one illustrated in FIG. 6. As illustrated in FIG. 19, the computers in which eight processes are started in total are assigned LIDs which find out the corresponding upper switches by changing communication paths to the upper switches in the cyclic order of, for example, A, B, C, D, A, B, C, and D. Thus, communication is performed without any link competition occurring in communication status where the computers with the started processes "0" to "3" transmit data in FIG. 2E in a manner similar to FIG. 6.

Figure 20:
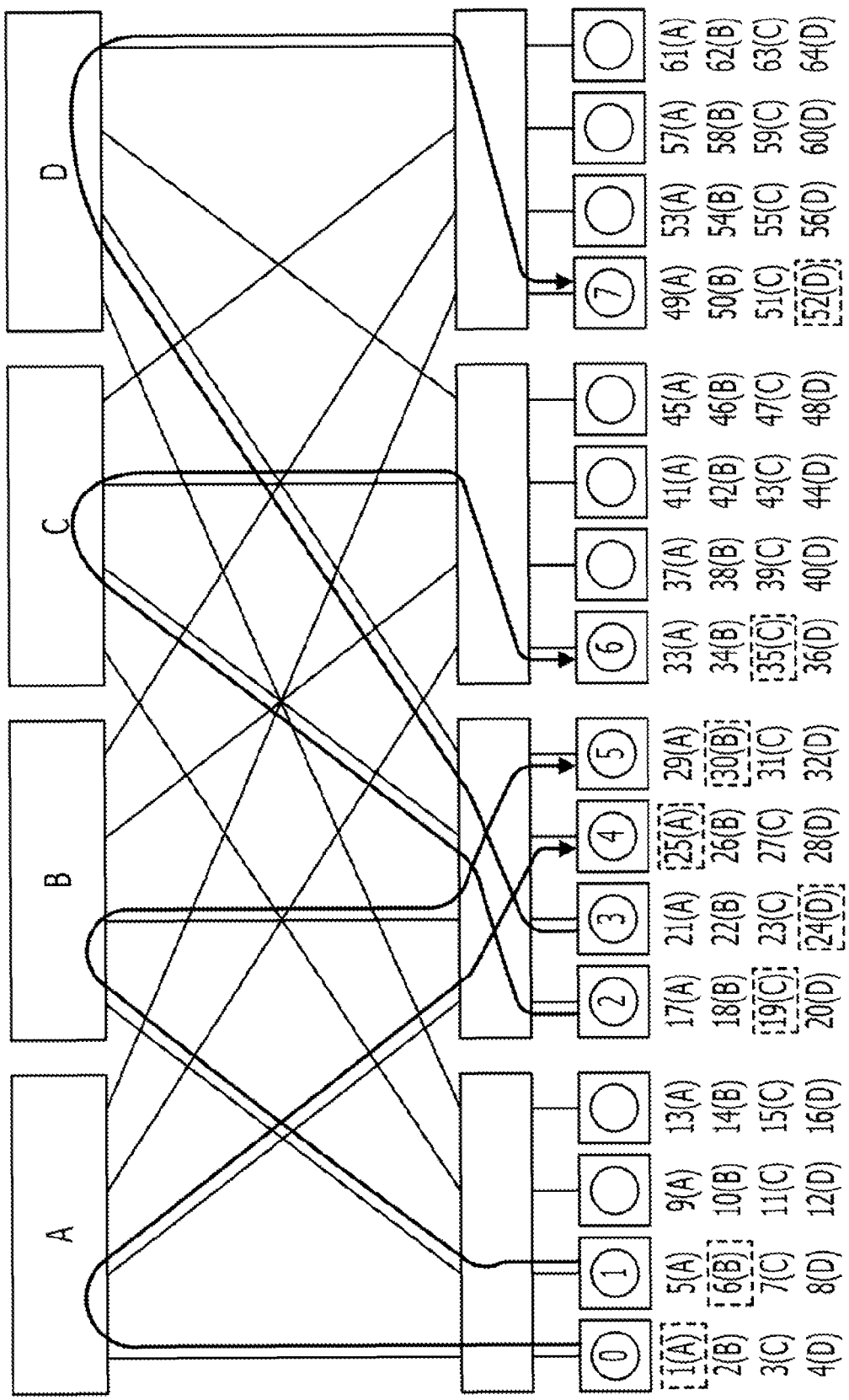
FIG. 20 is a diagram illustrating a case where link competition does not occur.

The same is applied to the case where a process-starting computer is changed. For example, as illustrated in FIG. 20, even if processes are started by other computers which are different from those illustrated in FIG. 19, the computers with the started processes are assigned LIDs which find out the corresponding upper switches by changing communication paths to the upper switches in the cyclic order as illustrated in FIG. 19. Thus, as in the case illustrated in FIG. 6, communication is performed without any link competition in communication status where the computers with the started processes "0" to "3" respectively transmit data in FIG. 2E.

As described above, even in a multipath multistage network where communication paths are not dynamically changed, an LID for every communication path is assigned to each computer in advance and the LIDs are then selected to distribute communication paths to the process-starting computers to avoid link competition. In other words, it becomes possible to perform inter-process communication at high speed, shortening the processing time of the parallel processing.

In the example described above, the initial processing unit 121, which corresponds to MPI_Init, specifies the LIDs of the computers, on which the respective processes are started, by itself. Alternatively, for example, a system illustrated in FIG. 21 may be employed to make a LID management computer 14 to intensively specify LIDs. The LID management computer 14 may be integrated with the start-up server 12 and the scheduling server 11. Furthermore, in a manner similar to the start-up server 12, the computer, where the process with the smallest process number is started, may act like the LID management computer 14.

Figure 21:
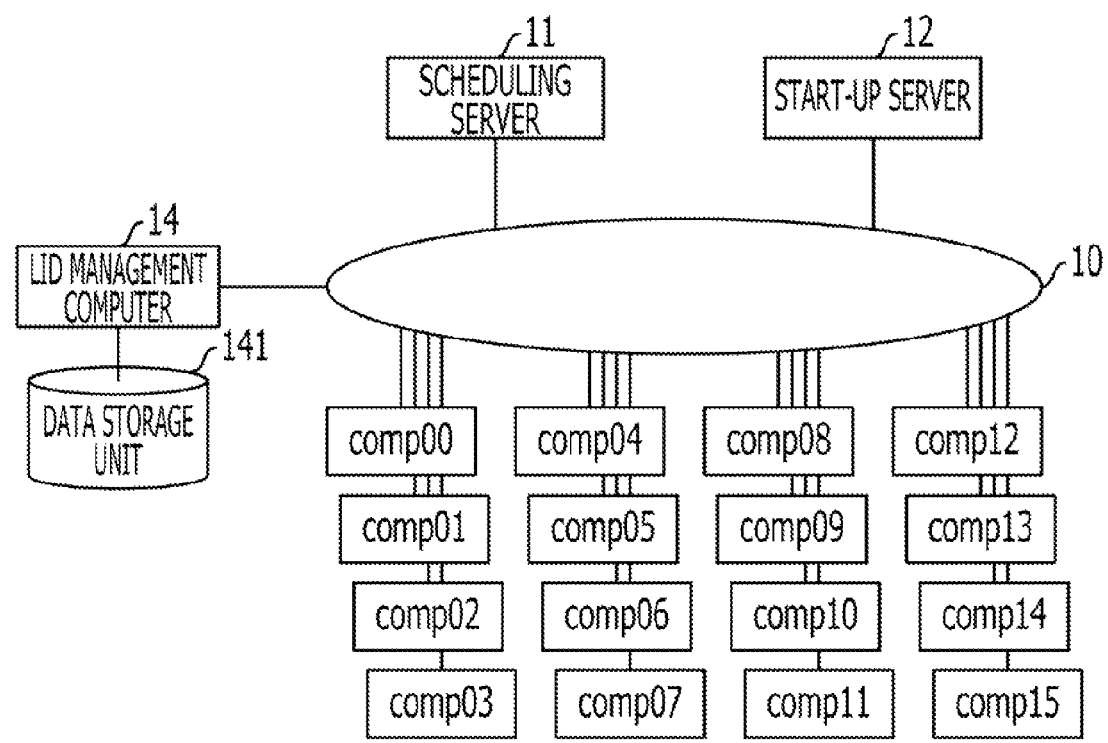
FIG. 21 is a diagram illustrating an exemplary system according to another embodiment.

In the system illustrated in FIG. 21, the LID management computer 14 is connected to a network 10 instead of the common storage 13. The LID management computer 14 includes a data storage unit 141. The data storage unit 141 stores LID files (FIG. 9). In addition, when the start-up server 12 notifies the LID management computer 14 about a correspondence table, the data storage unit 141 may also store the correspondence table.

Figure 22:
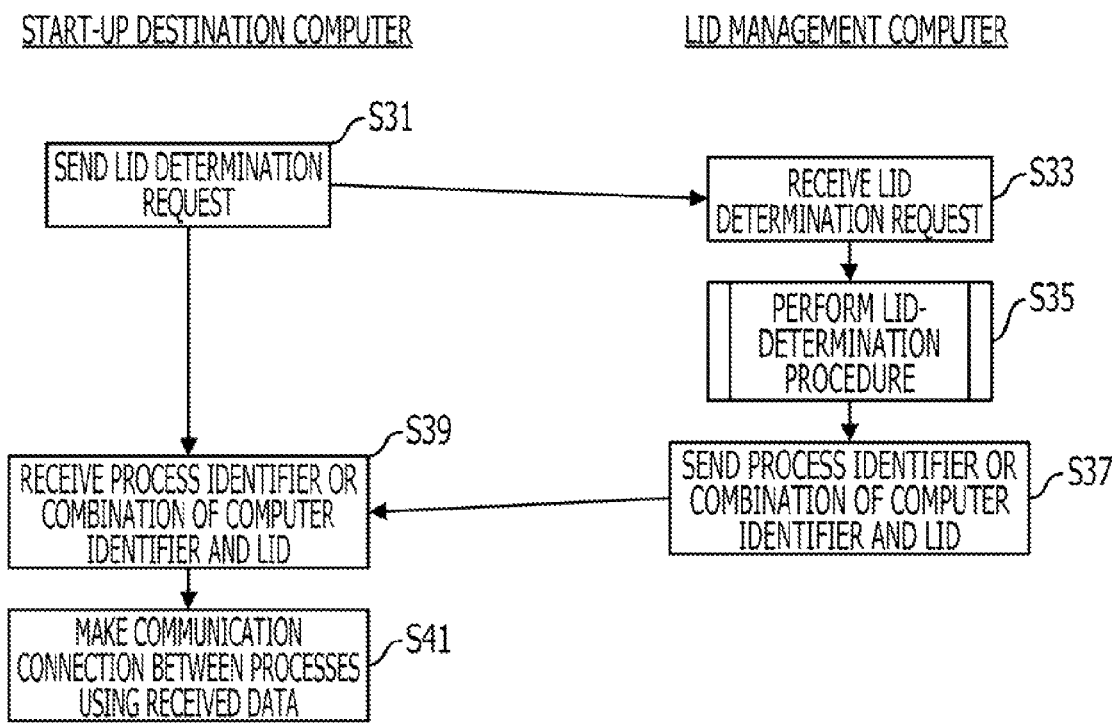
FIG. 22 is a diagram illustrating the operation of the system according to another embodiment.

Next, an exemplary operation of the system introduced with the LID management computer 14 as described above will be described with reference to FIG. 22. After calling out the initial processing unit 121 by starting the parallel process 110, the initial processing unit 121 transmits an LID determination request to the LID management computer 14 (step S31). The LID determination request may include, for example, a correspondence table. If the LID management computer 14 has already been notified by the start-up server 12 about the correspondence table, for example, the identifier information of the correspondence table may be included in the LID determination request.

Upon the LID management computer 14 receiving the LID determination request from the start-up destination computer (step S33), the LID management computer 14 performs an LID-determination procedure (step S35). The LID-determination procedure is a sequence of steps S11 to S25 of the process flow illustrated in FIG. 17. In the case of receiving the data of the correspondence table from the destination computer where the parallel process is started (also referred to as a selected computer), the reception is comparable to the acquisition in step S11.

The LID management computer 14 transmits a process identifier and/or a computer identifier, which are specified by the LID-determination procedure, to the requestor computer of the LID determination request (step S37). The initial processing unit 121 of the start-up destination computer receives the data of the process identifier and/or the computer identifier from the LID management computer 14 and then stores the data in the data storage region 130 or the like (step S39). Subsequently, the initial processing unit 121 makes a communication connection between the started processes using the received data in a manner similar to step S27 in FIG. 17 (step S41).

Consequently, the processing load of the initial processing unit 121 may be reduced.

Figure 18:
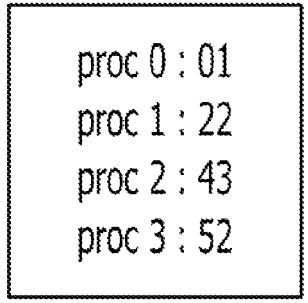
FIG. 18 is a diagram illustrating an exemplary correspondence data between a LID and a process identifier.

Alternatively, the computer having the function of the start-up server 12 may perform the procedure of the steps S11 to S25 in FIG. 17 before starting the process instead of a request base to notify each start-up destination computer about the data, the correspondence table, and the like as illustrated in FIG. 18. In this case, the generation of the correspondence table by the start-up server 12 is equivalent to the acquisition of the correspondence table.

The embodiment of the present technology has been described, but the present technology is not limited thereto. For example, the processing flow in FIG. 17 is only provided for illustrative purposes. As long as the results of the procedure are not changed, the sequence of steps may be changed or the steps may be carried out in parallel. For example, the sequence of steps S11 to S15 may be changed.

Figure 23:
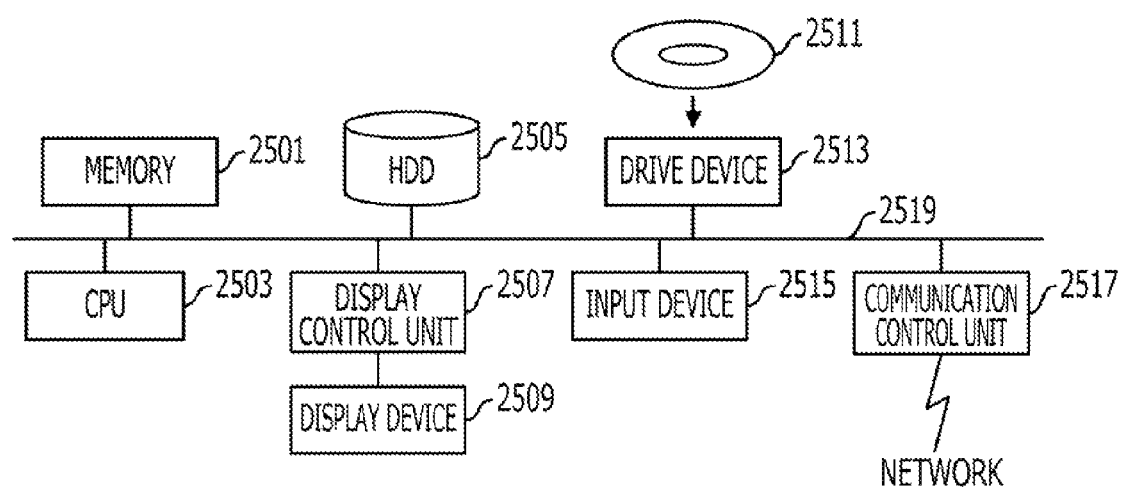
FIG. 23 is a functional block diagram illustrating a computer.

Furthermore, the aforementioned computer 100, start-up server 12, and scheduling server 11 are computer apparatuses. In each computer apparatus, as illustrated in FIG. 23, a memory 2501, a CPU 2503, a hard disk drive (HDD) 2505, a display control unit 2507 connected to a display device 2509, a drive device 2513 for a removable disk 2511, an input device 2515, and a communication control unit 2517 for connecting to a network are connected to one another through a bus 2519. An operating system (OS) and an application program for performing procedures in the present embodiment are stored in the HDD 2505 and read out from the HDD 2505 to the memory 2501 when executed by the CPU 2503. The CPU 2503 controls and allows the display control unit 2507, the communication control unit 2517, and the drive device 2513 to perform predetermined operations in response to the processing contents of the application program. Furthermore, the data being processed is stored mainly in the memory 2501, but may be alternatively stored in the HDD 2505. In the embodiment of the present technology, the application program for performing the aforementioned process(es) may be stored and distributed in a computer-readable removable disk 2511, and then installed from the drive device 2513 into the HDD 2505. Alternatively, the application program may be installed into the HDD 2505 via the network, such as the Internet, and the communication control unit 2517. The computer apparatus implements the various aforementioned functions by organizing cooperation between the aforementioned hardware, such as the CPU 2503 and the memory 2501, and the program, such as the application program.

The communication library 120 including the initial processing unit 121 and the all-to-all communication unit 123 is executed by the CPU 2503.

The embodiment described above may be summarized as follows:

A procedure of the present embodiment includes:

(A) acquiring correspondence data including a plurality of combinations of the identifiers of selected computers, where parallel processes are started, among a plurality of computers connected to a multipath network having relay devices extending over two or more hierarchies and the identifiers of the parallel processes; and (B) specifying a network identifier, which is used for distributing communication paths among the selected computers, for every selected computer containing an identifier in the correspondence data among network identifiers of the respective communication paths in the multipath network, and which is previously made to correspond to the respective computers' identifiers included in a plurality of computers, and are used for routing.

Therefore, a link competition may be avoided even when performing all-to-all communication in the multipath network as described above. Furthermore, the computer that executes this method may be provided as a plurality of computers connected to the multipath network as described above, or another computer may be provided.

Furthermore, the aforementioned procedure may further include making a connection between parallel processes using the specified network identifier. For example, in the case of executing the above method as an initial process after starting the parallel processes, making the connection in advance in this way allows an actual inter-process communication to be started promptly, thereby shortening the processing time as a whole.

Furthermore, the communication path described above may be specified by the upper switch through which the communication path passes in the above multipath network. In the case of an exemplary two-stage multi-path network, the upper switch may represent a communication path.

Furthermore, each of the identifiers of the parallel processes is assigned a sequential integral value corresponding to the number of started parallel processes. Then, the network identifiers may be arranged in a predetermined sequence of corresponding communication paths for the respective computers included in a plurality of computers. In this case, the aforementioned specific steps may include specifying a network identifier in the sequence of remaining numbers of communication paths, represented by integral values corresponding to the identifiers of the parallel process. Therefore, network identifiers may be easily specified.

Figure 24:
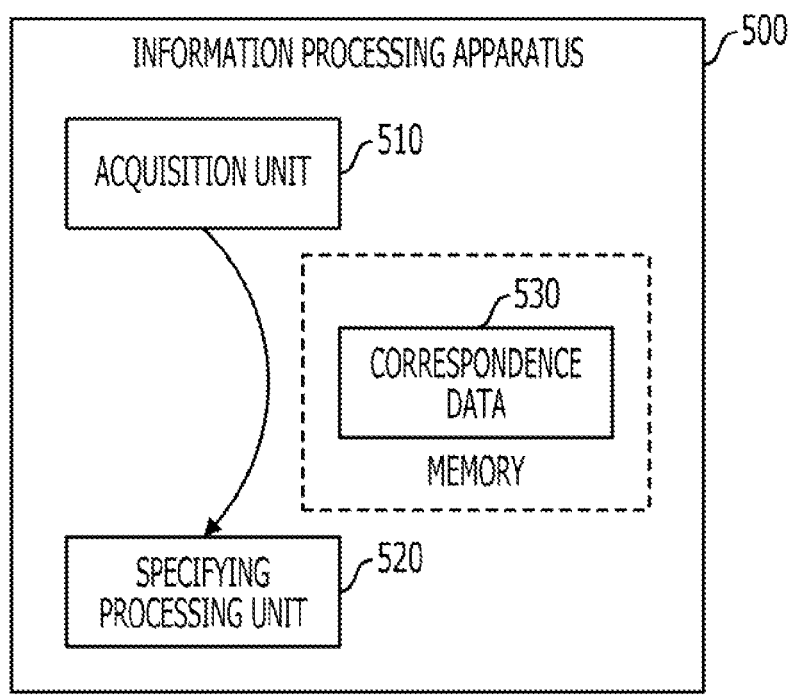
FIG. 24 is a functional block diagram illustrating an information processing apparatus.

The information processing apparatus of the present embodiment (500 in FIG. 24) includes:

(A) an acquisition unit (510 in FIG. 24) for acquiring correspondence data (530 in FIG. 24) including a plurality of combinations of the identifiers of selected computers, where parallel processes are started, among a plurality of computers connected to a multipath network having relay devices extending over two or more hierarchies and the identifiers of the parallel processes; and (B) a specifying processing unit (520 in FIG. 24) for specifying a network identifier, which is used for distributing communication paths among the selected computers, for every selected computer containing an identifier in the correspondence data among network identifiers of the respective communication paths in the multipath network, and which is previously made to correspond to the respective computers' identifiers included in a plurality of computers, and is used for routing.

Furthermore, a program for making computers perform the aforementioned process may be produced. The program may be stored in an optical disc, such as a flexible disc or a CD-ROM; an magnetic optical disc; a semiconductor memory, such as a ROM; or a computer-readable storage medium or a storage device, such as a hard disk. Furthermore, the data being processed is temporarily stored in a storage device, such as a RAM.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A computer-readable, non-transitory medium storing a communication program that causes a computer to execute a procedure, the procedure comprising:
   acquiring correspondence data including a plurality of combinations each storing a first identifier identifying one of selected computers in which parallel processes are started, in association with a second identifier identifying one of the parallel processes, the selected computers are among a plurality of computers connected to a multipath network having relay devices extending over two or more hierarchies, the multipath network including first communication paths that are respectively identified by first network identifiers; and
   specifying, from among the first network identifiers, second network identifiers respectively identifying second communication paths to be used for routing data among the selected computers so that the second communication paths are dispersed over the relay devices without overlapping with one another in the multipath network,
   each of the second identifiers of the parallel processes is assigned a sequential integral value corresponding to the number of the parallel processes being started; and
   the first network identifiers are arranged in a predetermined sequence of corresponding communication paths for each computer included in the plurality of computers; and
   the second network identifiers are each specified as the first network identifier that is at a first position in the predetermined sequence of corresponding communication paths, the first position being determined according to a reminder obtained by dividing the sequential integral value assigned to the each second identifier by a number of the predetermined sequence of corresponding communication paths.

2. The computer-readable, non-transitory medium according to claim 1, the procedure further comprising:
   making a connection between the parallel processes using the specified second network identifiers.

3. The computer-readable, non-transitory medium according to claim 1, wherein the second communication paths are specified by an upper switch through which the second communication paths pass in the multipath network.

4. An information processing apparatus comprising:
   an acquisition means for acquiring correspondence data including a plurality of combinations each storing a first identifier identifying one of selected computers in which parallel processes are started, in associating with a second identifier identifying one of the parallel processes, the selected computers are among a plurality of computers connected to a multipath network having relay devices extending over two or more hierarchies, the multipath network including first communication paths that are respectively identified by first network identifiers; and
   a specifying processing means for specifying, from among the first network identifiers, second network identifiers respectively identifying second communication paths to be used for routing data among the selected computers so that the second communication paths are dispersed over the relay devices without overlapping with one another in the multipath network,
   each of the second network identifiers of the parallel processes is assigned a sequential integral value corresponding to a number of the parallel processes being started; and
   the first network identifiers are arranged in a predetermined sequence of corresponding communication paths for each computer included in the plurality of computers; and
   the second network identifiers are each specified as the first network identifier that is at a first position in the predetermined sequence of corresponding communication paths, the first position being determined according to a reminder obtained by dividing the sequential integral value assigned to the each second identifier by a number of the predetermined sequence of corresponding communication paths.

5. An information processing apparatus comprising:
   a processor configured to execute a procedure, the procedure comprising:
   acquiring correspondence data including a plurality of combinations each storing a first identifier identifying one of selected computers in which parallel processes are started, in association with a second identifier identifying one of the parallel processes, the selected computers are among a plurality of computers connected to a multipath network having relay devices extending over two or more hierarchies, the multipath network including first communication paths that are respectively identified by first network identifiers; and
   specifying, from among the first path identifiers, second path identifiers respectively identifying second communication paths to be used for routing data among the selected computers so that the second communication paths are dispersed over the relay devices without overlapping with one another in the multipath network,
   each of the second path identifiers of the parallel processes is assigned a sequential integral value corresponding to a number of the parallel processes being started; and
   the first path identifiers are arranged in a predetermined sequence of corresponding communication paths for each computer included in the plurality of computers; and
   the second path identifiers are each specified as the first path identifier that is at a first position in the predetermined sequence of corresponding communication paths, the first position being determined according to a reminder obtained by dividing the sequential integral value assigned to the each second identifier by a number of the predetermined sequence of corresponding communication paths.

6. A communication method executed by a computer, the method comprising:
   acquiring correspondence data including a plurality of combinations each storing a first identifier identifying one of selected computers in which parallel processes are started, in association with a second identifier identifying one of the parallel processes, the selected computers are among a plurality of computers connected to a multipath network having relay devices extending over two or more hierarchies, the multipath network including first communication paths that are respectively identified by first network identifiers; and
   specifying, from among the first network identifiers, second network identifiers respectively identifying second communication paths to be used for routing data among the selected computers so that the second communication paths are dispersed over the relay devices without overlapping with one another in the multipath network, each of the second network identifiers of the parallel processes is assigned a sequential integral value corresponding to a number of the parallel processes being started; and the first network identifiers are arranged in a predetermined sequence of corresponding communication paths for each computer included in the plurality of computers; and the second network identifiers are each specified as the first network identifier that is at a first position in the predetermined sequence of corresponding communication paths, the first position being determined according to a reminder obtained by dividing the sequential integral value assigned to the each second identifier by a number of the predetermined sequence of corresponding communication paths.

* * * * *